United States Patent
Nulkar et al.

(10) Patent No.: US 7,873,712 B2
(45) Date of Patent: Jan. 18, 2011

(54) SYSTEM AND METHOD FOR AGGREGATING MANAGEMENT OF DEVICES CONNECTED TO A SERVER

(75) Inventors: Chaitanya Nulkar, Sunnyvale, CA (US); Huynh Duc Mai, Milpitas, CA (US)

(73) Assignee: Netapp, Inc., Sunnyvale, CA (US)

( * ) Notice: Subject to any disclaimer, the term of this patent is extended or adjusted under 35 U.S.C. 154(b) by 148 days.

(21) Appl. No.: 12/270,691

(22) Filed: Nov. 13, 2008

(65) Prior Publication Data

US 2010/0121908 A1 May 13, 2010

(51) Int. Cl.
*G06F 15/177* (2006.01)
(52) U.S. Cl. .............. 709/222; 714/47; 714/2; 709/223
(58) Field of Classification Search ......... 709/220–224; 714/2–4, 47–48
See application file for complete search history.

(56) References Cited

U.S. PATENT DOCUMENTS

| | | | |
|---|---|---|---|
| 6,718,376 B1 | 4/2004 | Chu et al. | |
| 7,634,681 B2 * | 12/2009 | Takamoto et al. ............ | 714/4 |
| 2003/0061320 A1 * | 3/2003 | Grover et al. ............... | 709/222 |
| 2004/0117369 A1 | 6/2004 | Mandal et al. | |
| 2005/0080956 A1 * | 4/2005 | Zaudtke et al. .............. | 710/72 |
| 2005/0129035 A1 | 6/2005 | Saito | |
| 2006/0242452 A1 * | 10/2006 | Kaiya et al. ................ | 714/2 |
| 2008/0126885 A1 * | 5/2008 | Tangvald et al. ............. | 714/54 |
| 2008/0162984 A1 | 7/2008 | Kalra et al. | |
| 2008/0256400 A1 * | 10/2008 | Yang et al. ................. | 714/57 |

OTHER PUBLICATIONS

"Baseboard management controller", *Wikipedia, the free encyclopedia*, 1 page, http://en.wikipedia.org/wiki/Baseboard_management_controller, last modified Oct. 8, 2007, last visited May 13, 2008.
Cisco HPC Network Solutions for Microsoft Windows Compute Cluster Server 2003, 9 pages, http://www.microsoft.com/whdc/device/storace/GPT_FAQ.mspx?pf=true, © 1992-2006 Cisco Systems.
"Compute Cluster Network Requirements", *Microsoft TechNet*, 7 pages, http://technet2.microsoft.com/windowsserver/en/library/f49b19ee-aa05-4f16-8132-36ee09..., last updated Jun. 6, 2006, last visited May 29, 2008.

(Continued)

*Primary Examiner*—Salad Abdullahi
(74) *Attorney, Agent, or Firm*—Brinks Hofer Gilson & Lione (57) ABSTRACT

A system and method are described for aggregating management of devices connected to a server. In one embodiment, devices connected to a server may be identified by an operating system of the server. The devices may be in communication with one another through a network. The operating system may communicate a network identifier of each device to a service processor of the server. The service processor may aggregately manage the devices independent from the operating system. The service processor may receive management commands from an external source. Each of the management commands may be associated with one of the connected devices, but the connected devices may be incapable of communicating directly with the external source. The service processor may communicate each management command to the device associated with the management command using the network identifier of the associated device. The management command can then be performed on the associated device.

20 Claims, 7 Drawing Sheets

OTHER PUBLICATIONS

"High Performance Computing with Windows Compute Cluster Server 2003", 58 pages, Doug de Werd, HP Technology Forum 2006, Session 1344.

"Microsoft Windows Compute Cluster Server 2003: Overview of Microsoft Windows Compute Cluster Server 2003", 12 pages, Charlie Russel, published Sep. 2005, updated Nov. 2005.

"IBM cluster software: Cluster Systems Management (CSM)", *IBM*, 2 pages, http://www-03.ibm.com/systems/clusters/software/csm., last visited May 29, 2008.

"IBM System Cluster 1350 announcement", *IBM*, 2 pages, http://www-03.ibm.com/systems/clusters/news/announcement/20060606_annc.html., last visited May 29, 2008.

"Introduction to Microsoft Windows Compute Cluster Server 2003", *Microsoft TechNet*, 2 pages, http://technet2.microsoft.com/windowsserver/en/library/cf667fe-aca7-45f8-94a3-3ad0814..., last updated Jun. 6, 2006, Microsoft Corporation, last visited May 29, 2008.

"Intelligent Platform Management Interface", *Wikipedia, the free encyclopedia*, 1 page, http://en.wikipedia.org/wiki/IPMI, last modified May 12, 2008, last visited May 13, 2008.

"Redbooks Paper, Linux Clustering with CSM and GPFS", *IBM*, ibm.com/redbooks, 344 pages, S. Hochstetler et al., Copyright IBM Corp.2004.

"NetApp—Our Solutions—Solution Partners—Manage ONTAP", *NetApp*, 1 page, http://www.printthis.clickability.com/pt/cpt?action=cpt&title=NetApp+-+Our+Scolutions+-..., last visited May 13, 2008.

"NetApp updates Data ONTAP Software", 1 page, L. Mearian, Nov. 15, 2004, http://www.computerworld.com/action/article.do?command=printArticleBasic&articleID=..., ComputerWorld, last visited May 14, 2008.

"Data OnTAP 7G Operating System", *NetApp, Network Appliance, Inc.*, 4 pages, © 2007 Network Appliance, Inc.

"Out-of-band", *Wikipedia, the free encyclopedia*, 2 pages, http://en.wikipedia.org/wiki/Out-of-Band, last modified Feb. 16, 2008, last visited May 13, 2008.

"Systems Management Architecture for Server Hardware", *Wikipedia, the free encyclopedia*, 1 page, http://en.wikipedia.org/wiki/Systems_Management_Architecture_for_Server_Hardware, last modified Nov. 15, 2007, last visited May 13, 2008.

"What is Windows Compute Cluster Server 2003?", *Microsoft TechNet*, 3 pages, http://technet2.microsoft.com/WindowsServer/en/library/5cf4d652-aa16-4b9a-ba40-e8144..., last updated Jun. 6, 2006, © 2008 Microsoft Corporation, last visited May 29, 2008.

"Windows HPC Server 2008—Technical Overview of Microsoft Windows HPC Server 2008 Beta 1", Microsoft Corporation, 23 pages, Nov. 2007.

"Introducing Windows HPC Server 2008 Beta 2", *Microsoft*, 4 pages, © 2008 Microsoft Corporation.

Search Report and Written Opinion for Corresponding PCT application No. PCT/US2009/064025, 8 pages, Jan. 6, 2010.

\* cited by examiner

SYSTEM AND METHOD FOR AGGREGATING MANAGEMENT OF DEVICES CONNECTED TO A SERVER

BACKGROUND

A cluster is a group of individual servers configured to appear as a single, virtual server, to both users and applications. Each individual server may be connected through an in-band connection to one or more devices, such as storage devices, input/output devices, managed switches, and power delivery units. The operating system of the server may be used to aggregately manage the connected devices. Management of the devices may include retrieving logs from the devices, performing resets or power cycles on the devices, or updating the firmware and configuration of the devices. However, it may be undesirable to rely on the operating system of the server to manage the devices because a failure of the operating system would render the devices unmanageable.

Alternatively the devices may be managed independently from the operating system of the server by opening an out-of-band connection, such as a direct network connection, to each device. A direct network connection would ensure the devices are manageable even when the operating system of the server fails. However, opening a direct network connection to each device may compromise the security of the server. Furthermore, it may be time consuming to manage each of the devices individually. Thus, there may be a need for a system for aggregately managing devices connected to a server independent of the operating system of the server.

DETAILED DESCRIPTION

In these embodiments, a system is presented for providing aggregate management of devices connected to a server independent from the server's operating system, which provides advantages over the prior systems by allowing the devices to be managed even when the operating system of the server fails. The system enables aggregate management of connected devices independent from the operating system by incorporating a secondary processor into the server, referred to as a service processor. The service processor communicates directly with the connected devices and manages the connected devices independent of the operating system. The service processor receives management commands from external sources through a dedicated external network connection. Since the service processor can manage the connected devices independent of the operating system, a failure of the operating system does not render the connected devices unmanageable. In addition, since the connected devices can be aggregately managed through the external network connection of the service processor, individual network connections do not need to be opened to each device.

The system in these embodiments enables the aggregate management of devices connected to a server by utilizing a service processor to manage the connected devices independent from the operating system of the server. The service processor runs independently from, but in communication with, an operating system of the server, such as NetApp's Data ONTAP™ storage operating system. The service processor may be included in the server's storage controller, such as a NetApp® Storage Controller card. The service processor of the server may be referred to as the aggregating service processor since it is responsible for aggregately managing each connected device. The aggregating service processor manages the connected devices by communicating management commands to a service processor of each device over a local area network.

The operating system of the server is also in communication with each connected device through an in-band connection on the server, such as a system bus. The in-band connection allows the operating system to detect the presence of a connected device through the system bus and provide configuration information for the connected device, such as a network identifier, to the aggregating service processor. The aggregating service processor can use the network identifier to communicate with the connected device over the local area network.

The aggregating service processor can receive management commands from sources external to the server through an external network connection. The management commands may be directed to the server or to one or more of the devices connected to the server. The aggregating service processor determines which device the management command is directed to and communicates the management command to the device's service processor over the local area network. The device's service processor then performs the management command on the device and communicates any response, such as log data, to the aggregating service processor. The aggregating service processor may communicate the response to the source of the management command. Alternatively the aggregating service processor may store the responses from the connected devices and may communicate the stored responses, in aggregate, to the source of the management commands on a periodic basis.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

Figure 1:
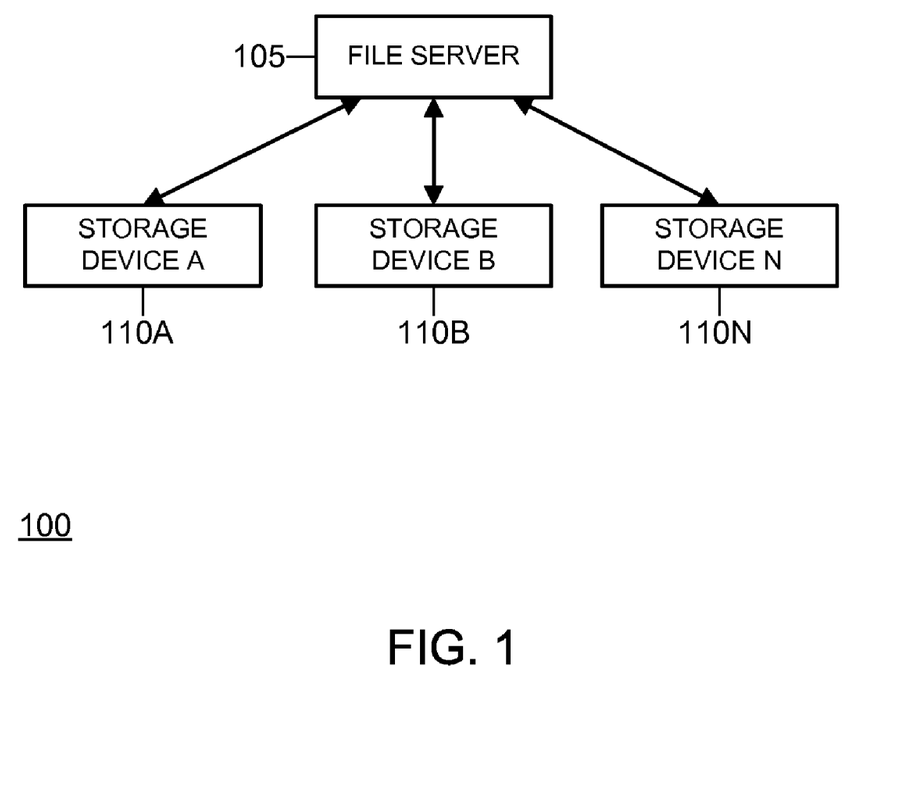
FIG. 1 is a block diagram of a general overview of a system of an embodiment for aggregating management of devices connected to a server.

Turning now to the drawings, FIG. 1 provides a general overview of a system 100 of an embodiment for aggregating management of devices connected to a server. Not all of the depicted components may be required, however, and some implementations may include additional components. Variations in the arrangement and type of the components may be made without departing from the spirit or scope of the claims as set forth herein. Additional, different or fewer components may be provided.

In this embodiment, system 100 includes a file server 105, or filer, and one or more storage devices 110A-N connected to the file server 105. Alternatively or in addition the file server 105 may be connected to other devices, such as input/output devices, power delivery units (PDUs), managed switches, uninterruptible power supplies (UPS), or generally any device which may be connected to a server.

The file server 105 is a computer that provides file service relating to the organization of information stored on the storage devices 110A-N. The embodiments described herein can apply to any type of file server 105, whether implemented as a special-purpose or general-purpose computer, including a standalone computer. The file server 105 may implement a write-anywhere file system, such as the Write Anywhere File Layout (WAFL™) file system available from NetApp, Inc. The WAFL file system is implemented within a microkernel as part of the overall protocol stack of the file server 105 and associated disk storage. This microkernel is supplied as part of NetApp's Data ONTAP™ storage operating system, running on the file server 105, which processes file-service requests from network-attached clients.

The file server 105 and the storage devices 110A-N may each include a service processor, such as a baseboard management controller (BMC). The service processors may be used to manage the storage devices 110A-N independently from the operating system of the file server 105. The service processor of the file server 105 may be referred to as the aggregating service processor, while the service processor of the storage devices 110A-N may be referred to as managed service processors. In this embodiment the aggregating service processor is the service processor of the file server 105. However, in other embodiments the aggregating service processor may be any service processor with a dedicated external network connection, and a mechanism for identifying the storage devices 110A-N connected to the file server 105. The storage devices 110A-N may be connected to the file server 105 through an in-band connection, such as the system bus; while separately the service processors of the storage devices 110A-N may be connected to the service processor of the file server 105 through a private network.

Management commands can be communicated to the service processor of the file server 105 through the external network connection. Alternatively, the operating system of the file server 105 may communicate management commands directly to the service processor of the file server 105 through the system bus. The management commands may be directed to one or more of the storage devices 110A-N, such as the storage device A 110A, or the management commands may be directed to the file server 105. The service processor of the file server 105 identifies the storage device A 110A a management command is directed to and provides the management command to the service processor of the storage device A 110A. The service processor of the storage device A 110A then performs the management command on the storage device A 110A.

The system 100 enables the aggregate management of the storage devices 110A-N by allowing the storage devices 110A-N to be managed from a single point, such as the aggregating service processor. Thus, the storage devices 110A-N don't need to be individually accessed and managed, but may all be managed through the aggregating service processor. Aggregating the management of the storage devices 110A-N may also refer to performing a management command on several of the storage devices 110A-N simultaneously. For example, the aggregating service processor may receive a management command, such as a log retrieval command, which is directed to all of the storage devices 110A-N. In this case the aggregating service processor would communicate the command to all of the storage devices 110A-N simultaneously, thus preventing the need to direct the command to each storage device 110A-N individually.

Management commands may be used to manage the storage devices 110A-N. The management commands may include retrieving logs from any one of the storage devices 110A-N, or retrieving logs from the storage devices 110A-N in aggregate, taking an action on any of the storage devices, such as resetting a storage device A 110A or performing a power cycle on a storage device A 110A, updating the firmware or configuration of the storage devices 110A-N, receiving and acting upon alerts from the storage devices 110A-N, checking the environmental variables of the storage devices 110A-N, or generally any management command which may be performed on any of the storage devices 110A-N. A management command of checking the environmental variables of the storage devices 110A-N may include checking the temperature, voltage, and/or fans of the storage devices 110A-N. The system 100 may also provide aggregated console redirection to allow direct access to a management interface on any of the storage devices 110A-N.

In operation, when the operating system of the file server 105 is booted, the operating system detects the storage devices 110A-N connected to the file server 105 through the in-band interface. The operating system determines the configuration information of the storage devices 110A-N, including the network identifiers of the service processors of the storage devices 110A-N, and provides the configuration information to the aggregating service processor. The aggregating service processor uses the network identifiers to connect to the individual service processors of each storage device 110A-N. The operating system of the file server 105 can also notify the aggregating service processor when a storage device 110A-N is added or removed from the file server 105.

The aggregating service processor receives commands from an external device, or from the operating system of the file server 105. The management commands may be directed to one or more of the storage devices 110A-N. The aggregating service processor determines the storage device A 110A each management command is directed to, and provides the management command to the service processor of the storage device 110A-N. If the command includes a request for data, such as log data, the service processor of a storage device A 110A communicates a response including the log data to external device through the network connection of the aggregating service processor.

Figure 2:
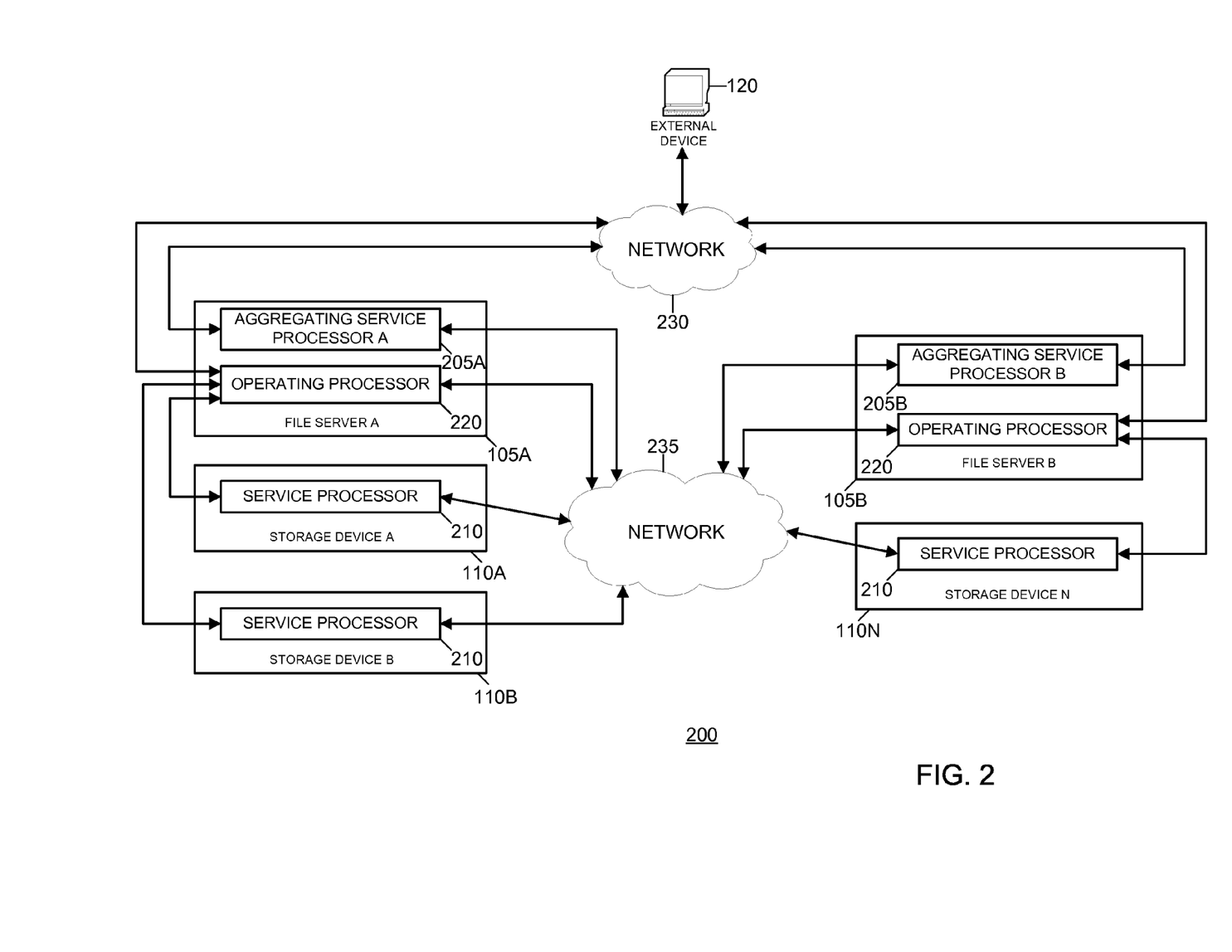
FIG. 2 is a block diagram of an exemplary network environment implementing two file servers of an embodiment.

FIG. 2 is a block diagram of an exemplary network environment 200 implementing two file servers of an embodiment. Not all of the depicted components may be required, however, and some implementations may include additional components. Variations in the arrangement and type of the components may be made without departing from the spirit or scope of the claims as set forth herein. Additional, different or fewer components may be provided.

The network environment 200 includes external device 240, file servers 105A-B, storage devices 110A-N, and networks 230, 235. File servers 105A-B include aggregating service processors 205A-B, and operating processors 220. The storage devices 110A-N include service processors 210. The storage devices 110A-N are connected to the file servers 105A-N via an in-band connection, such as a bus. The aggregating service processors 205A-N and the service processors 210 are in communication with each other over the network 235.

The operating processors 220 of the file servers 105A-N execute an operating system capable of detecting the storage devices 110A-N connected to the file servers 105A-N, such as NetApp's Data ONTAP™ file operating system. The operating systems of the file servers 105A-N communicate via an in-band interface, such as a bus, with the operating processors 205A-B. The aggregating service processors 205A-B may each include at least two network interfaces. The first network interface communicates over a local area network 235 with the service processors 210 of the storage devices 110A-N, and the second network interface communicates with devices connected to the network 230, such as the external device 240.

The service processors 205A-B, 210 may be baseboard management controllers (BMCs), such as a Super Baseboard Management Controller (SuperBMC) or an Integrated Baseboard Management Controller (IBMC). The service processors 210 communicate with the operating systems of the file servers 105A-N through the in-band interface. The service processors 210 communicate with the aggregating service processors 205A-N through the network 235. The service processors 210 may communicate with the aggregating service processors 205A-N using a communication protocol, such as the Systems Management Architecture for Server Hardware (SMASH) protocol, or the Interoperable Message-Passing Interface (IMPI) protocol. The communication sessions between the service processors 210 and the aggregating service processors 205A-B may be persistent. Therefore a new connection does not need to be opened each time a management command is communicated to one of the service processors 210. The aggregating service processors 205A-B may communicate with the service processors 210 of any of the storage devices 110A-N.

The operating systems of the file servers 105A-N can detect the storage devices 110A-N connected to the file servers 105A-N, and communicate configuration information for each of the storage devices 110A-N to the aggregating service processors 205A-B. The configuration information may include an identifier of each service processor 210 of the storage devices 110A-N, such as an Internet Protocol (IP) address of each service processor 210. The aggregating service processors 205A-B may use the identifiers to send management commands to the service processors 210 over the network 235. If the operating system fails to communicate the configuration information to the aggregating service processors 205A-B, the aggregating service processors 205A-B may use their external network connection to retrieve configuration information from an external source, such as the external device 240. Alternatively the aggregating service processors 205A-B may use an external network connection to retrieve configuration information for devices which are not discoverable by the operating system, such as, input/output chasses, PDUs, UPSs, or managed switches.

The aggregating service processors 205A-B may maintain aggregate information describing the storage devices 110A-N connected to each of the file servers 105A-B. In order to maintain the aggregate information, each file server 105A-B may be associated with an identifier. The identifier may be used to identify which storage devices 110A-N are connected to each of the file servers 105A-B. The associations between the file servers 105A-B and the storage devices 110A-N may be used to maintain a logical view of the storage devices 110A-N connected to the file servers 105A-B.

The aggregating service processors 205A-B may retrieve logs from the service processors 210 of the storage devices 110A-N and may communicate the logs to the external device 240. The logs may be retrieved from the service processors 210 on a regular basis or may be sent to the aggregating service processors 205A-B on a regular basis. The aggregating service processors 205A-B may communicate notifications or alerts, such as error notifications, to the external device 240. The notifications may be sent through any communication service, such as through an email service, a messaging service, a phone service, or generally any service capable of communicating an error notification.

The aggregating service processors 205A-B may maintain policies, such as access control policies, for managing the storage devices 110A-N independent of the operating system of the file servers 105A-B. The policies may identify the management commands an external device 240 is allowed to perform, such as accessing logs or performing actions on the storage devices 110A-N. Alternatively, the operating system of the file servers 105A-B may implement high level policies which may override the policies of the aggregating service processors 205A-B.

The operating system may utilize the aggregating service processors 205A-B for performing management commands on the storage devices 110A-N. For example, the operating system may request logs or error notifications of the storage devices 110A-N from the aggregating service processors 205A-B. Alternatively the operating system may request an action be performed on one of the storage devices 110A-N through the aggregating service processors 205A-B.

Networks 230, 235 can be local area networks (LANs), wide area networks (WANs), virtual private networks (VPNs) utilizing communication links over the internet, for example, or a combination of LAN, WAN, and VPN implementations. The network 235 may be used for communicating between the service processors 210 of the storage devices 110A-N, and may be located in a single geographic location. The service processors 210 of the storage devices 110A-N may be unable to communicate outside of the network 235, such as with the external device 240. The service processors 210 of the storage devices 110A-N may reside on the same subnet. The firmware running on each of the service processors 210 supports dynamic host protocol configuration (DHCP) and may automatically configure the internet protocol (IP) address of the service processors 210. The storage devices 110A-N may be subject to a broadcast rate limit.

For the purposes of this description, the term network should be taken broadly to include any acceptable network architecture. The network 235 interconnects the service processors 205A-B, 210. Each of the devices attached to the networks 230, 235 includes an appropriate conventional network interface arrangement (not shown) for communicating over the network using desired communication protocols such as the well-known Transport Control Protocol/Internet Protocol (TCP/IP), User Datagram Protocol (UDP), Hyper Text Transport Protocol (HTTP), Simple Network Management Protocol (SNMP), or Virtual Interface Connections (VI).

The external device 240 may run an application for managing the file servers 105A-B and the connected storage devices 110A-N, or may run an interface for accessing an application for managing the file servers 105A-B. The application may allow access to one or more configuration interfaces of the aggregating service processors 205A-B, such as a network configuration interface, an alerts and notifications configuration interface or a user credentials interface.

In operation, when the operating processors 220 of the file servers 105A-B are powered on, the operating systems running on the operating processors 220 detect the storage devices 110A-N connected to the file servers 105A-B via the in-band interface. The operating systems communicate configuration information describing the service processors 210, such as the network identifiers of the service processors 210, to the aggregating service processors 205A-B. The operating systems detect when storage devices 110A-N are added or removed from the file servers 105A-B, and communicate the changes to the aggregating service processors 205A-B.

The aggregating service processors 205A-B establish a persistent communication channel with the service processors 210 of the storage devices 110A-N through the network 235. The aggregating service processors 205A-B may receive management commands directed to the storage devices 110A-N from the external device 240. Alternatively the aggregating service processors 205A-B may receive management commands from the operating system of the file servers 105A-B via the in-band interface.

When the aggregating service processor A 205A receives a management command from the external device 240, the aggregating service processor A 205A determines the storage device 110A-B the command is directed to, such as the storage device A 110A. The aggregating service processor A 205A communicates the management command to the service processor 210 of the storage device A 110A. The service processor 210 then performs the management command on the storage device A 110A. If the management command requires a response, such as a command to retrieve log files, the service processor 210 of the storage device 110A communicates the response to the aggregating service processor A 205A. The aggregating service processor A 205A may then communicates the response to the external device 240.

Figure 3:
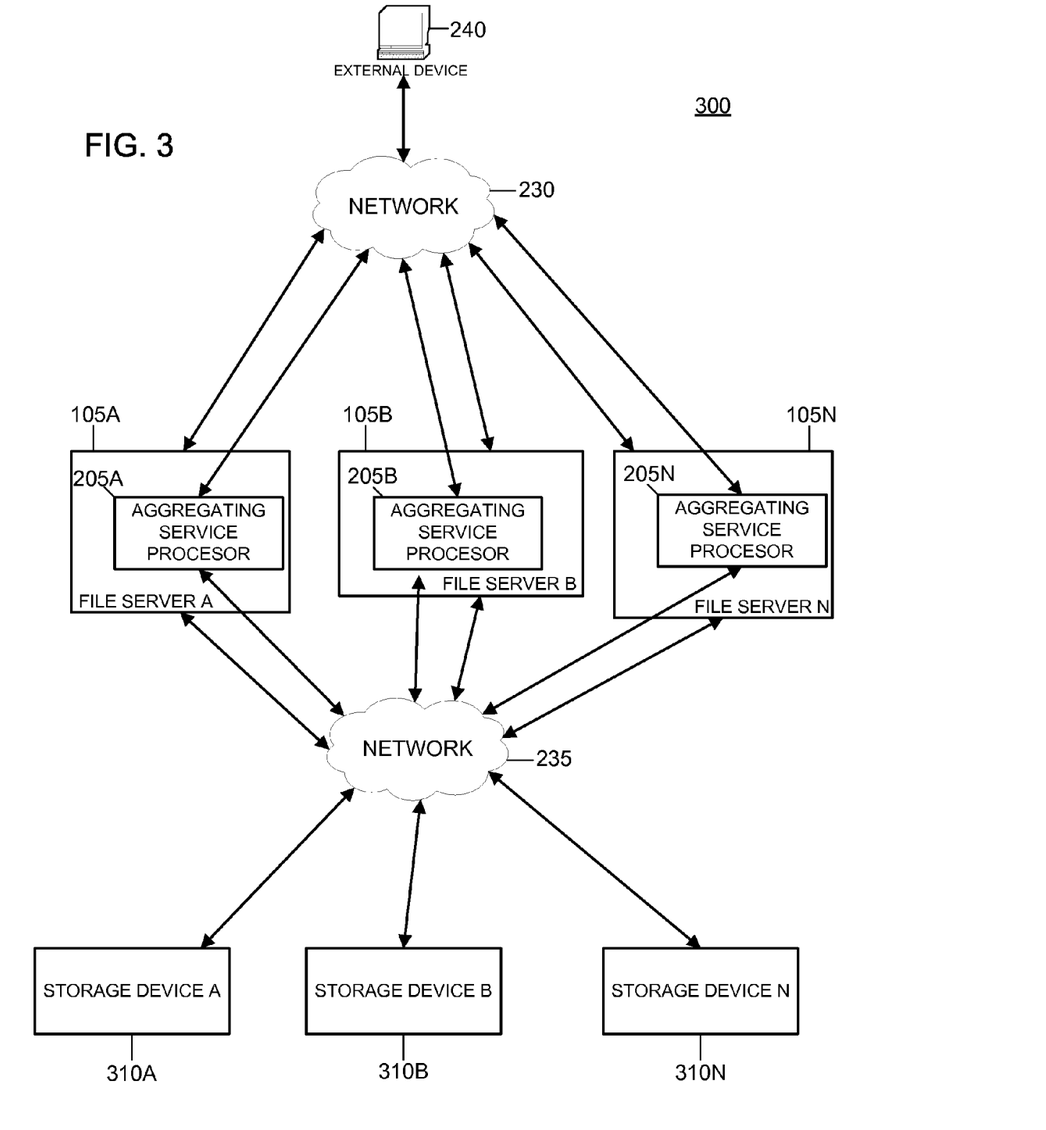
FIG. 3 is a block diagram of an exemplary network environment of an embodiment.

FIG. 3 is a block diagram of an exemplary network topology 300 of an embodiment. Not all of the depicted components may be required, however, and some implementations may include additional components. Variations in the arrangement and type of the components may be made without departing from the spirit or scope of the claims as set forth herein. Additional, different or fewer components may be provided.

The network topology 300 may include an external device 240, networks 230, 235, file servers 105A-N, and storage devices 310A-N. The file servers 105A-N include aggregating service processors 205A-N. The storage devices 310A-N may not include service processors and/or may not be associated with a specific file server 105A-N. Since the storage devices 310A-N do not include service processors, the storage devices 310A-N are managed through the native management interfaces of the storage devices 310A-N, such as management interfaces provided by the firmware of the storage devices 310A-N. The native management interfaces may be accessed by the aggregating service processors 205A-N via the network 235. The aggregating service processors 205A-N may communicate with the native management interfaces using extensible markup language (XML) communication protocol, a hypertext transfer protocol (HTTP), a simple network management protocol (SNMP), or generally any communication protocol implemented by the native management interfaces of the storage devices 110A-N.

Figure 4:
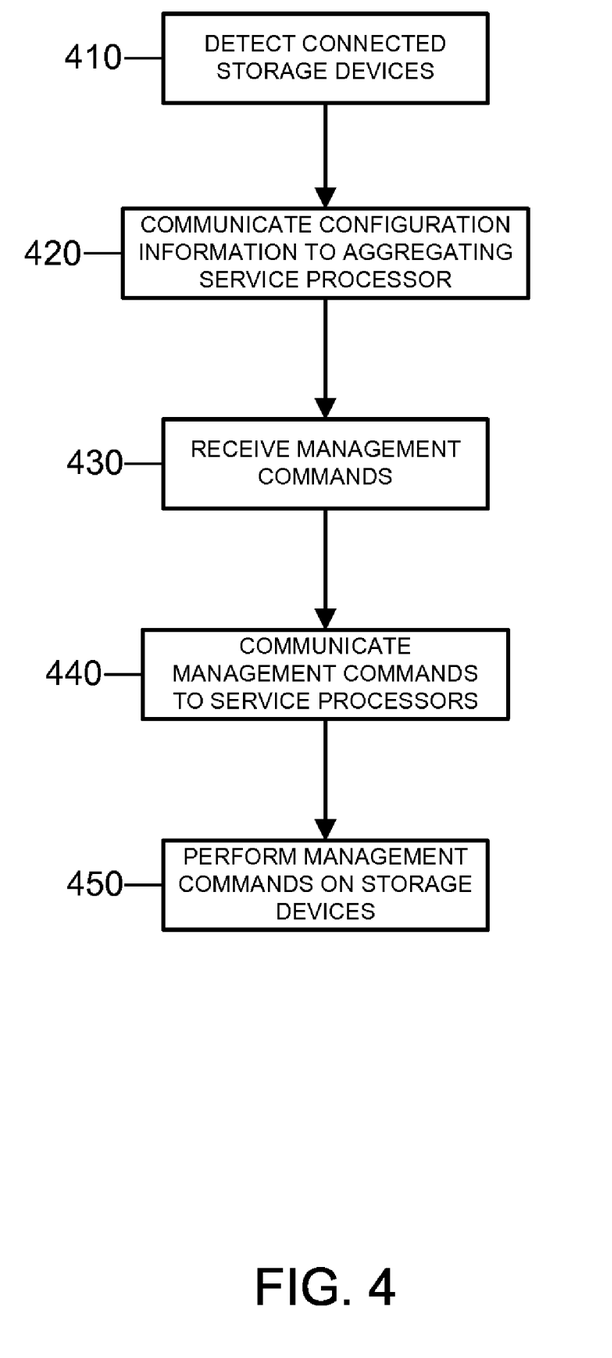
FIG. 4 is a flowchart illustrating a device-detection operation of an embodiment.

FIG. 4 is a flowchart illustrating an overview of a device-detection operation of an embodiment. At step 410, the operating system running on the operating processor 220 of the file server A 105A detects the storage devices 110A-B connected to the file server A 105A via the in-band interface. At step 420, the operating system of the file server A 105A communicates the configuration information of the connected storage devices 110A-B to the aggregating service processor A 205A. The configuration information may include network identifiers of the service processors 210 of the storage devices 110A-B. The aggregating service processor A 205A may establish a persistent communication channel with each of the service processors 210 identified in the configuration information.

At step 430, the aggregating service processor A 205A may receive management commands directed to one of the storage devices 110A-B. The aggregating service processor A 205A may receive the management commands from the external device 240, or from the operating system of the file server A 105A. At step 440, the aggregating service processor A 205A determines the storage device the command is directed to, such as the storage device A 110A, and communicates the management command to the service processor 210 of the storage device A 110A via the network 235.

At step 450, the management command is performed on the storage device A 110A by the service processor 210 of the storage device A 110A. If the management command necessitates a response, such as in the case of retrieving log data, the service processor 210 of the storage device A 110A communicates the response to the aggregating service processor A 205A. The aggregating service processor A 205A may provide the response data to the entity initially communicating the management command, such as the external device 240.

Figure 5:
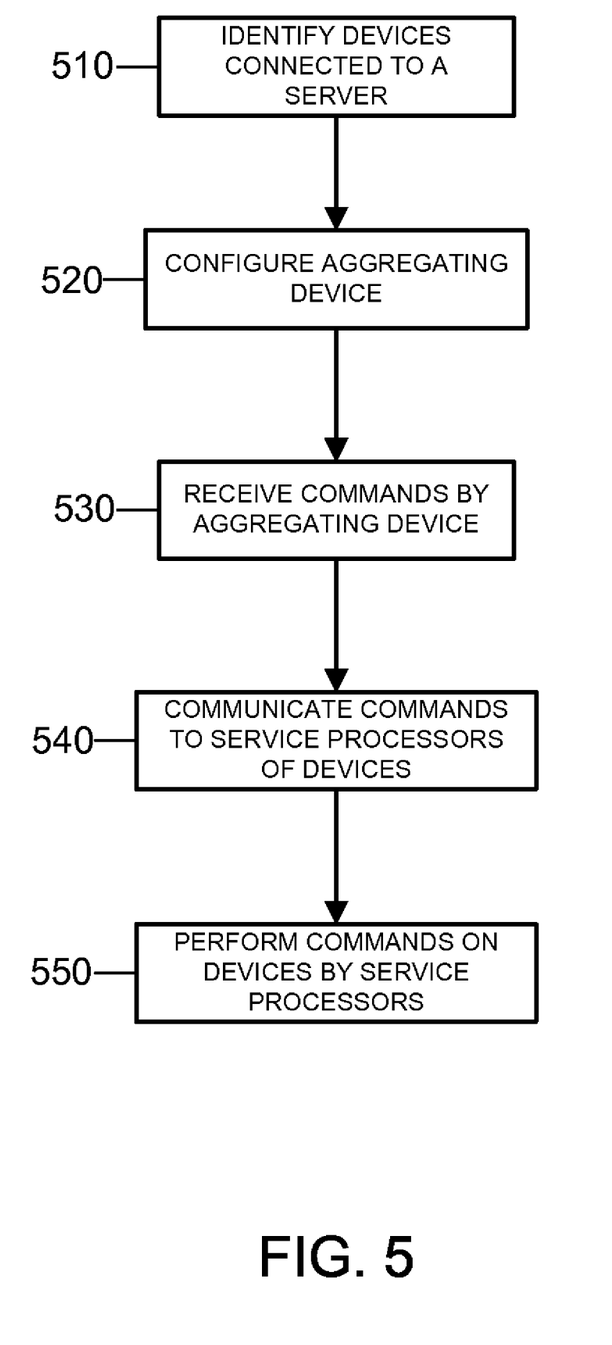
FIG. 5 is a flowchart illustrating a device-configuration operation of an embodiment.

FIG. 5 is a flowchart illustrating an overview of a device-configuration operation of an embodiment. At step 510, the system 100 identifies the devices connected to a server, such as the storage devices 110A-B connected to the file server A 105A. At step 520, the system 100 configures the service processor of one of the devices 110A-B, or the service processor of the file server A 105A, as the aggregating service processor A 205A. In the previously discussed embodiments the file server A 105A was configured with the aggregating service processor A 205A; however, a service processor 210 of a storage device A 110A may alternatively be configured as the aggregating service processor if the storage device A 110A has an external network connection to the network 230 for communicating with the external device 240, and a network connection to the network 235 for communicating with the other service processors 210. Once the aggregating service processor A 205 is identified, the operating system of the file server A 105A provides the aggregating service processor with network identifiers of the other service processors 210.

At step 530, the aggregating service processor A 205A receives management commands from the external device 240. The management commands may be directed to, or associated with, the storage devices 110A-B or the file server A 105A. At step 540, the aggregating service processor A 205A communicates the management commands to the service processor 210 of the storage device A 110A associated with each management command. At step 550, the service processor 210 of the associated storage device A 110A performs the management commands on the storage device A 110A. If the management command requires a response, the service processor 210 of the storage device A 110A provides the response to the aggregating service processor A 205A. The aggregating service processor A 205A then provides the response to the external device 240.

Figure 6:
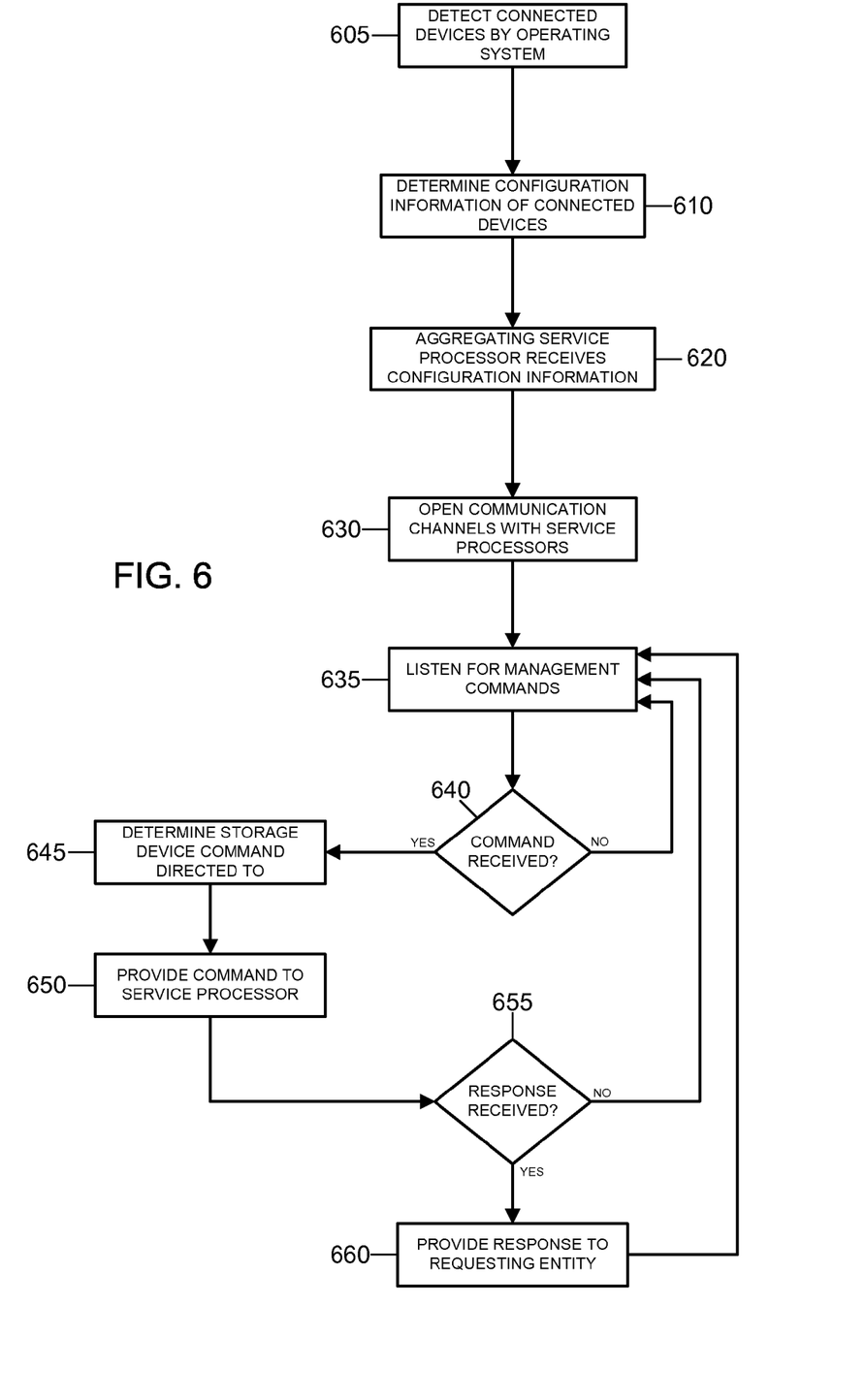
FIG. 6 is a flowchart illustrating a device-management operation of an embodiment.

FIG. 6 is a flowchart illustrating an overview of a remote-device-management operation of an embodiment. At step 605, the operating system of the file server A 105A detects the storage devices 110A-B connected to the file server A 105A. At step 610, the operating system determines the configuration information of the storage devices 110A-B connected to the server A 105A, such as the network identifiers of the service processors 210 of the storage devices 110A-B. At step 620, the aggregating service processor A 205A receives the configuration information from the operating system. Alternatively or in addition, the configuration information may be received by the aggregating service processor A 205A from an external source via an out of band interface, such as the external network connection.

At step 630, the aggregating service processor A 205A establishes persistent communication channels with the service processors 210 of the storage devices 110A-B over the network 235. At step 635, the aggregating service processor A 205A listens for management commands, such as management commands from the external device 240. At step 640, the aggregating service processor A 205A determines whether a management command was received. If, at step 640, the aggregating service processor A 205A determines that a management command was not received, the system 100 returns to step 635 and the aggregating service processor A 205A continues to listen for management commands.

If, at step 640, the aggregating service processor A 205A determines that a management command was received, the system 100 moves to step 645. At step 645, the aggregating service processor A 205A determines the storage device 110A-B the management command is directed to, such as the storage device A 110A. At step 650, the aggregating service processor A 205A communicates the management command to the service processor 210 of the storage device A 110A. The service processor 210 of the storage device A 110A performs the management command on the storage device A 110A.

At step 655, the aggregating service processor A 205A determines whether a response was received from the service processor 210. If, at step 655, the aggregating service processor A 205A determines a response was not received, or is not expected, the system 100 returns to step 635, and the aggregating service processor A 205A continues to listen for management commands. If, at step 655, the aggregating service processor A 205A determines a response was received from the service processor 210, the system 100 moves to step 660. If at step 655, the aggregating service processor A 205A determines a response was not received, but is expected, the system 100 may continue to wait for a response. At step 660, the aggregating service processor A 205A provides the response data received from the service processor 210, such as log data, to the entity that sent the management command, such as the external device 240. The system 100 then returns to step 635, and the aggregating service processor A 205A continues to listen for additional management commands.

Figure 7:
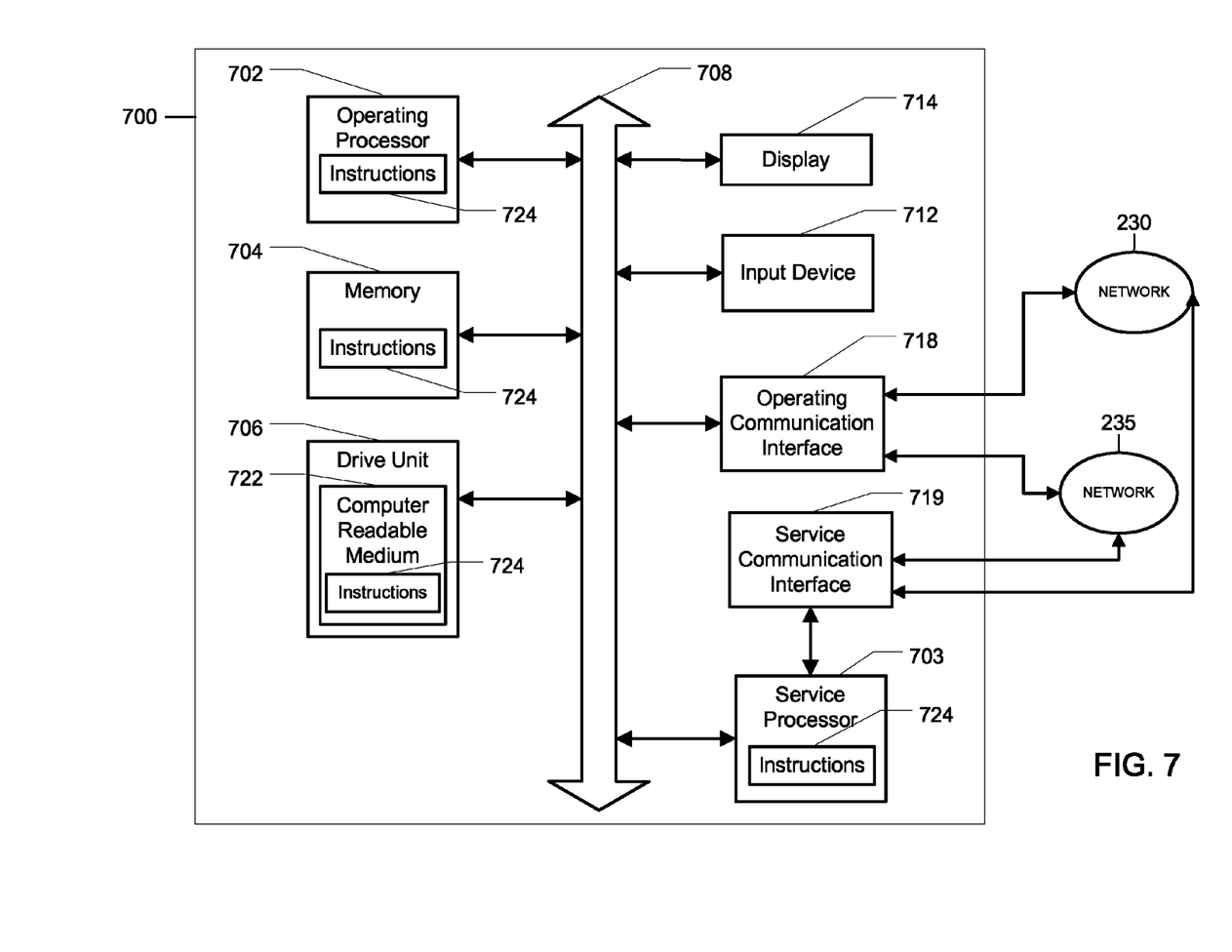
FIG. 7 is an illustration of a computer to be used as an exemplary file server of an embodiment.

FIG. 7 illustrates an exemplary computer system 700 which may be used as a file server 105 in an embodiment. The computer system 700 includes a set of instructions 724 that may be executed to cause the computer system 700 to perform any one or more of the methods or computer based functions disclosed herein. The computer system 700 may operate as a standalone device or may be connected, e.g., using a network, to other computer systems or peripheral devices.

In a networked deployment, the computer system 700 operates in the capacity of a file server 105. The computer system 700 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions 724 (sequential or otherwise) to manage the storage devices 110A-N connected to the file server 105. While a single computer system 700 is illustrated, the term "system" includes any collection of systems or sub-systems that individually or jointly execute a set, or multiple sets, of instructions to perform one or more computer functions.

As illustrated in FIG. 7, the computer system 700 includes an operating processor 702 and a service processor 703, such as a central processing unit (CPU), a graphics processing unit (GPU), or both. The processors 702, 703 may be a component in a variety of systems. For example, the processors 702, 703 may be part of a standard personal computer or a workstation. The processors 702, 703 may also be one or more general processors, digital signal processors, application specific integrated circuits, field programmable gate arrays, servers, networks, digital circuits, analog circuits, combinations thereof, or other now known or later developed devices for analyzing and processing data.

The computer system 700 includes a memory 704 that can communicate via a bus 708. The memory 704 can be a main memory, a static memory, or a dynamic memory. The memory 704 can be any type of computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 704 includes a cache or random access memory for the processors 702, 703. Alternatively, the memory 704 can be separate from the processors 702, 703, such as a cache memory of a processor, the system memory, or other memory. The memory 704 could also be an external storage device or database for storing data. Examples may include a hard drive, compact disc ("CD"), digital video disc ("DVD"), memory card, memory stick, floppy disc, universal serial bus ("USB") memory device, or any other device operative to store data. The memory 704 stores instructions 724 executable by the processors 702, 703. The functions, acts or tasks illustrated in the figures or described herein may be performed by the programmed processors 702, 703 executing the instructions 724 stored in the memory 704. The functions, acts or tasks can be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The computer system 700 further includes a display 714, such as a liquid crystal display (LCD), an organic light emitting diode (OLED), a flat panel display, a solid state display, a cathode ray tube (CRT), a projector, a printer or other now known or later developed display device for outputting determined information. The display 714 acts as an interface for the user to see the functioning of the processors 702, 703, or specifically as an interface with the software stored in the memory 704 or in the drive unit 706.

Additionally, the computer system 700 includes an input device 712 configured to allow a user to interact with any of the components of system 100. The input device 712 can be a number pad, a keyboard, or a cursor control device, such as a mouse, or a joystick, touch screen display, remote control or any other device operative to interact with the system 100.

The computer system 700 may also include a disk or optical drive unit 706. The disk drive unit 706 includes a computer-readable medium 722 in which one or more sets of instructions 724, e.g. software, can be embedded. Further, the instructions 724 can perform one or more of the methods or logic as described herein. The instructions 724 may reside completely, or at least partially, within the memory 704 and/or within the processors 702, 703 during execution by the computer system 700. The memory 704 and the processors 702, 703 can also include computer-readable media as discussed above.

The present disclosure contemplates a computer-readable medium 722 that includes instructions 724 or receives and executes instructions 724 responsive to a propagated signal; so that a device connected to one of networks 230, 235 may communicate voice, video, audio, images or any other data over the networks 230, 235. Further, the instructions 724 may be transmitted or received over the networks 230, 235 via a communication interfaces 718, 719. The communication interfaces 718, 719 may be a part of the processors 702, 703 or may be a separate component. The communication interfaces 718, 719 may be created in software or may be a physical connection in hardware. The communication interfaces 718, 719 may be configured to connect with networks 230, 235, external media, the display 714, or any other components in system 700, or combinations thereof. The connection with the networks 230, 235 may be a physical connection, such as a wired Ethernet connection or may be established wirelessly as discussed below. Likewise, the additional connections with other components of the system 100 may be physical connections or may be established wirelessly.

The networks 230, 235 may include wired networks, wireless networks, or combinations thereof. The wireless network may be a cellular telephone network, an 802.11, 802.16, 802.20, or WiMax network. Further, the networks 230, 235 may be public networks, such as the Internet, private networks, such as an intranet, or combinations thereof, and may utilize a variety of networking protocols now available or later developed including, but not limited to TCP/IP based networking protocols.

The computer-readable medium 722 may be a single medium, or the computer-readable medium 722 may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium 722 may include a solid-state memory such as a memory card or other package that houses one or more non-volatile read-only memories. The computer-readable medium 722 also may be a random access memory or other volatile re-writable memory. Additionally, the computer-readable medium 722 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

We claim:

1. A method for aggregating management of devices connected to a server, the method comprising:
    detecting, by an operating system of a server, a plurality of devices connected to the server, wherein the plurality of devices are in communication with one another through a network;
    communicating a network identifier of each device from the operating system of the server to a service processor of the server, the service processor for aggregately managing the devices independent from the operating system, wherein the service processor aggregately manages the device even when the operating system fails;
    receiving, by the service processor of the server, a plurality of management commands from a source external to the network, each management command being associated with a device in the plurality of devices, wherein the plurality of devices are incapable of communicating with the source external to the network;
    communicating each management command from the service processor to the device associated with the management command using the network identifier of the device; and
    performing the management command on the device associated with the management command.

2. The method of claim 1 further comprising receiving, by the service processor, a response from the device associated with the management command.

3. The method of claim 2 further comprising providing, by the service processor, a notification of the response to the source external to the network.

4. The method of claim 3 wherein the notification comprises at least one of an email notification, a messaging service notification, or a voice notification.

5. The method of claim 1 wherein a command in the plurality of management commands comprises at least one of a reset command, a power cycle command, or a firmware update command.

6. The method of claim 1 further comprising retrieving, by the service processor, a data item stored on a device in the plurality of devices.

7. The method of claim 1 wherein performing the command on the device associated with the management command further comprises causing the management command to be performed by the device associated with the management command.

8. The method of claim 1 wherein the network identifier of each device is communicated from the operating system to the service processor via an in-band interface.

9. The method of claim 1 wherein the server comprises of a file server and at least one of the plurality of devices comprises of a storage device.

10. The method of claim 1 wherein at least one of the plurality of devices comprises of an input/output device, a power delivery unit, a managed switch, an uninterruptible power supply, or a storage shelf.

11. A method for configuring a plurality of devices connected to a server for aggregate management, the method comprising:
   identifying a plurality of devices connected to a server, each device being associated with a service processor for managing each device independently from an operating system of each device such that a failure of each operating system does not result in a failure of each service processor, wherein the service processors are in communication with one another through a network;
   configuring one of the devices in the plurality of devices as an aggregating device, wherein the service processor of the aggregating device is capable of communicating with a source external to the network;
   receiving, by the service processor of the aggregating device, a plurality of commands from the source external to the network, each command associated with a device in the plurality of devices;
   communicating each command from the service processor of the aggregating device to the service processor of the device associated with the command; and
   performing each command on the device associated with the command by the service processor of the device.

12. The method of claim 11 further comprising receiving, by the service processor of the aggregating device, a response from the service processor of the device associated with each command.

13. The method of claim 12 further comprising providing, by the service processor of the aggregating device, the response to the source external to the network.

14. The method of claim 11 wherein a command in the plurality of commands comprises at least one of a reset command, a power cycle command, a console redirection command, or a firmware update command.

15. The method of claim 11 further comprising retrieving, by the service processor of the aggregating device, a data item stored on a device in the plurality of devices.

16. A system for aggregating management of devices connected to a server, the system comprising:
   an operating processor operative to:
      detect a plurality of devices connected to a server, wherein the plurality of devices are in communication with one another through a network; and
      communicate an identifier of each device to a service processor; and
   the service processor in communication with the operating processor, the service processor for aggregately managing the devices independent from the operating processor such that the service processor is not affected by a failure of the operating processor, the service processor operative to:
      receive the identifier of each device from the operating processor;
      receive a plurality of management commands from a source external to the network, each management command associated with a device in the plurality of devices;
      communicate each management command to the device associated with the command using the identifier of the associated device; and
      perform each management command on the device associated with the management command.

17. The system of claim 16 wherein the service processor is further operative to:
   receive a response from the device associated with each management command; and
   communicate the response to the source external to the network.

18. The system of claim 16 wherein a management command in the plurality of management commands comprises at least one of a reset command, a power cycle command, or a firmware update command.

19. The system of claim 16 wherein the operating processor and the service processor are in communication via an in-band interface.

20. The system of claim 16 wherein the service processor is further operative to retrieve a data item stored on a device in the plurality of devices.

* * * * *